United States Patent [19]

Kirayoglu

[11] Patent Number: 4,869,947

[45] Date of Patent: Sep. 26, 1989

[54] LAMINATED FABRIC FOR PROTECTIVE CLOTHING

[75] Inventor: Birol Kirayoglu, Wilmington, Del.

[73] Assignee: E. I. Du Pont de Nemours and Company, Wilmington, Del.

[21] Appl. No.: 287,268

[22] Filed: Dec. 21, 1988

[51] Int. Cl.[4] .......................................... B32B 27/14
[52] U.S. Cl. .................................. 428/198; 428/246; 428/252; 428/287; 428/297; 428/298; 428/408; 428/902; 428/920; 428/340
[58] Field of Search .............. 428/233, 297, 298, 287, 428/252, 408, 902, 920, 198, 219, 246, 340

[56] References Cited

U.S. PATENT DOCUMENTS

| | | | |
|---|---|---|---|
| 3,769,144 | 10/1973 | Economy et al. | 428/287 |
| 3,849,332 | 11/1974 | Bailey et al. | 252/422 |
| 4,075,172 | 2/1978 | Ozawa et al. | 260/47 |
| 4,217,386 | 8/1980 | Arons et al. | 428/408 |
| 4,510,193 | 4/1985 | Blücher et al. | 428/196 |
| 4,513,047 | 4/1985 | Leach et al. | 428/246 |
| 4,748,065 | 5/1988 | Tanikella | 428/283 |

Primary Examiner—James J. Bell

[57] ABSTRACT

A laminated fabric suitable for use in protective clothing is disclosed in which a layer of activated charcoal cloth is adhered to a layer of woven reinforcing fabric. The layer of reinforcing fabric has a weight less than about 100 g/m² and contains sufficient high modulus aramid fiber to impart to the reinforcing fabric a tensile strength greater than about 44 newton/cm at an elongation of 3.5%.

12 Claims, 1 Drawing Sheet

LAMINATED FABRIC FOR PROTECTIVE CLOTHING

BACKGROUND OF THE INVENTION

The present invention relates to protective clothing to be worn to provide protection from a contaminated environment and more particularly relates to a laminated fabric for use in such clothing.

Various approaches have been taken to provide fabrics for protective clothing to be worn by military personnel and others to provide protection against chemicals such as chemical warfare agents. Spun-laced nonwoven protective fabrics have been impregnated with absorbant carbonized particles as disclosed in U.S. Pat. No. 4,748,065. Other known fabrics include quilted fabrics and multilayer materials incorporating woven or nonwoven activated carbon fabrics as disclosed in U.S. Pat. Nos. 3,769,144 and 4,513,047.

Activated carbon fabrics, referred to generally as "activated charcoal cloth", are generally effective in protective clothing to provide protection from chemical agents. However, activated charcoal cloth does not have sufficiently high durability for clothing to be used under harsh conditions such as those encountered in military use. Activated charcoal cloth has a propensity to break and develop holes causing the protective clothing to lose its effectiveness in protecting against chemical agents.

SUMMARY OF THE INVENTION

In accordance with the invention, a laminated fabric suitable for use in protective clothing is provided in which a layer of activated charcoal cloth is adhered to a layer of woven reinforcing fabric. The layer of reinforcing fabric has a weight less than about 100 g/m$^2$ and contains sufficient high modulus aramid fiber to impart to the reinforcing fabric a tensile strength greater than about 44 newton/cm (N/cm) at an elongation of 3.5%.

In accordance with the preferred form of the present invention, the high initial modulus aramid fiber in the reinforcing fabric is staple fiber which comprises about 40% to about 100% of the total fiber in the reinforcing fabric. The remaining fiber in the fabric is preferably a flame retardant low modulus staple fiber such as poly(-metaphenylene isophthalamide) or cotton.

The laminated fabric when incorporated into protective clothing provides both excellent absorbancy and wear characteristics and much less risk of the activated charcoal cloth breaking and developing holes. In addition, the laminate is sufficiently lightweight that clothing employing the fabric poses less risk of heat stress to the wearer. The laminate is particularly well-suited for use in clothing for use in severe conditions and thus is well-suited for military use.

DETAILED DESCRIPTION

Figure 1:
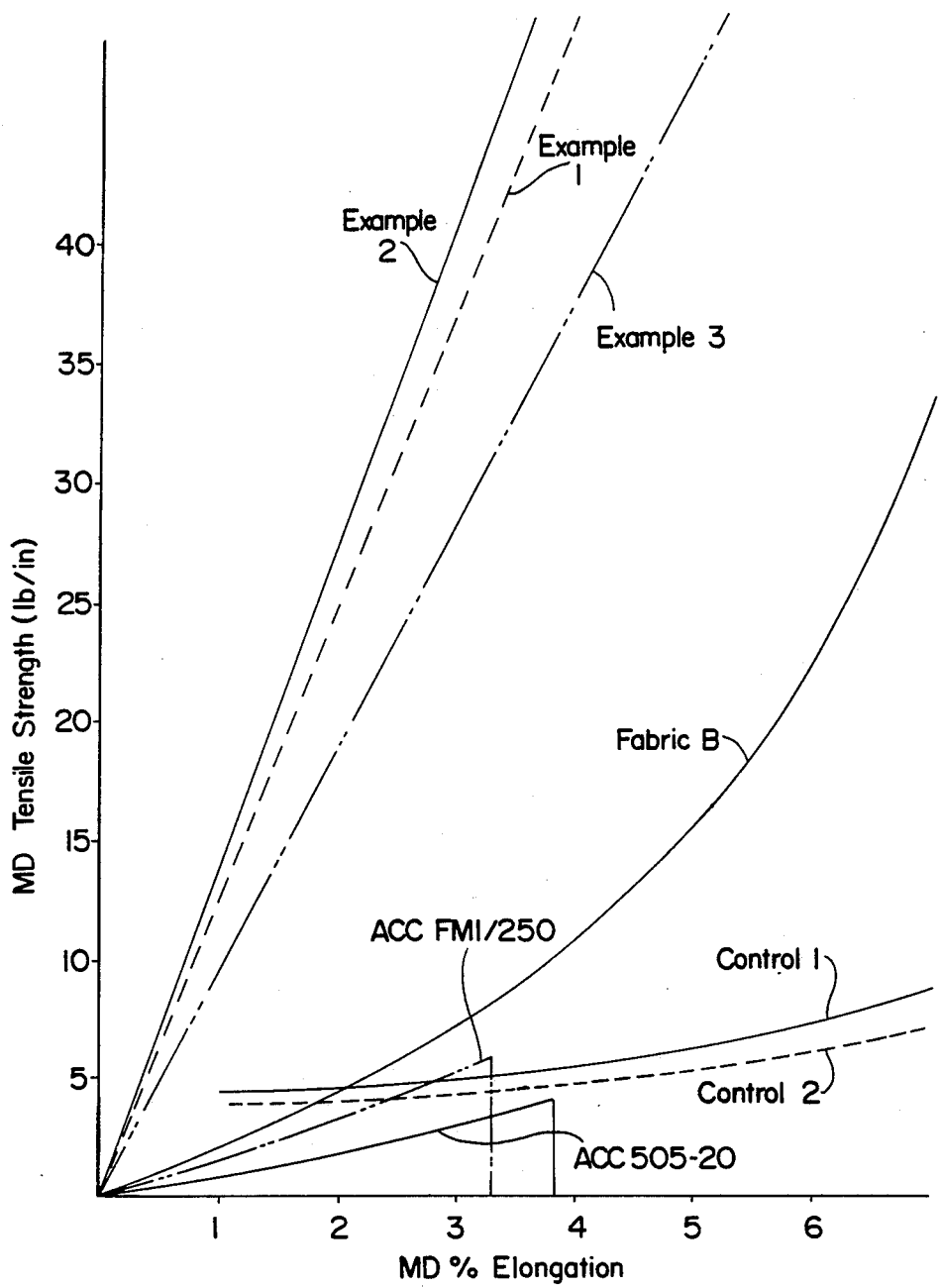
FIG. 1 is a graphical representation of machine direction (MD) tensile strength plotted against MD percent elongation for laminated fabrics of the invention, Examples 1-3, and control fabrics (activated charcoal cloth alone shown also).

Activated charcoal cloth useful in a laminate in accordance with the present invention is well-known. Activated charcoal cloth is an activated carbon absorbant fabric in the form of a woven, nonwoven or knitted cloth of 100 percent pure activated carbon and can be produced by the method disclosed in U.S. Pat. No. 3,849,332, which is incorporated herein by reference. For use in the laminated fabric in accordance with the present invention, the activated charcoal cloth preferably has a weight of between about 65 and about 200 g/m$^2$.

Woven activated charcoal cloth is commercially available from Charcoal Cloth Limited, Maidenhead, Berkshire, Great Britain, under the designation FM1/250 which has a weight of 100 g/m$^2$ (3.0 oz/yd$^2$). A similar activated charcoal cloth is available from American Kynol Company, New York, N.Y. under the designation 505-20.

A laminated fabric in accordance with the present invention includes a reinforcing fabric which contains sufficient high initial modulus aramid fiber to impart a tensile strength to the fabric of greater than about 44 newton/cm (approximately 25 lb/in) at 3.5% elongation. In this patent application, high initial modulus aramid fiber is intended to refer to aromatic polyamide fibers having an initial modulus of greater than about 200 g/d. A preferred high modulus fiber for use in the reinforcing fabric is poly(paraphthalene terephthalamide) (PPD-T) such as the fiber sold under the trademark Kevlar ® by E. I. du Pont de Nemours and Company, Wilmington, Del. Other high initial modulus fibers include copolymers of poly(p-phenylene terephthalamide) such as the fiber sold under the trademark Technora by Teijin Limited, Osaka, Japan, which is produced by reacting terephthalic acid with a mixture of diamines comprising 3,4'-diaminodiphenyl ether and paraphenylene diamine as disclosed in U.S. Pat. No. 4,075,172. High initial modulus aromatic polyamide fibers are inherently flame resistant and do not melt under high temperature conditions.

The reinforcing fabric has a weight less than about 100 g/m$^2$ (3.0 oz/yd$^2$) and preferably is plain woven from between about 10 and about 70 cotton count yarns. Most preferably, the reinforcing fabric has a weight of between about 35 and about 85 g/m$^2$ (1.0 to 2.5 oz/yd$^2$). Yarns for use in weaving the fabric can be continuous filament yarns with or without twist or preferably yarns spun from high initial modulus aramid staple fiber. Sheath/core yarns can also be used. To produce yarns from staple and fabrics from such yarns, conventional yarn spinning and weaving techniques can be employed.

In the form of the invention employing staple fiber, the high initial modulus aramid staple can be the sole fiber in the fabric. To decrease the cost of the fabric, however, the high initial modulus aramid fiber is blended before spinning with staple fibers having a modulus less than about 200 g/d provided that about 40 percent of the reinforcing fabric is high initial modulus aramid fiber. Any such low initial modulus staple fiber is preferably treated to make the fiber flame retardant, e.g., flame retardant cotton, or is inherently flame retardant such as poly(metaphenylene isophthalamide). Poly(metaphenylene isothalamide) fiber is commercially available under the trademark Nomex ® from E. I. Du Pont de Nemours and Company, Wilmington, Del.

In the preferred form of the invention, the activated charcoal cloth is adhered to the reinforcing fabric preferably by means of a flame retardant thermoplastic adhesive applied in a random dot pattern. A suitable adhesive is, for example, a flame retardant polyester adhesive such as Bostik S174476 sold by Bostik Division, Emhart Corporation, Middleton, Mass. The adhesive can be applied using the screen method. The amount of adhesive applied is such that the reinforcing fabric is adhered to the activated charcoal cloth but not enough to hamper air permeability of the fabric. It is preferable to use adhesive in amount which covers between about 20 percent and about 60 percent of the fabric area.

The laminated fabric in accordance with the present invention is well-suited for use in protective clothing. When incorporated into such clothing, the fabric can be used in conjunction with other layers which are laminated to the fabric or are used, for example, as an outer covering or an inner liner for the laminate. The laminated fabric in accordance with the present invention provides improved wear over known constructions since the reinforcing fabric has sufficient tensile strength to prevent the activated charcoal cloth from being extended to the break point during the wear conditions typically encountered in the use of such clothing. This is accomplished in the laminate of the invention which is sufficiently lightweight that clothing made out of the laminate does not impose high heat stress on the wearer.

The present invention is illustrated in the following examples which are not intended to be limiting.

EXAMPLES 1 and 2

In the following examples the following commercially-available activated charcoal cloth (ACC) was used:

TABLE 1

| ACC FM1/250 from Charcoal Cloth Ltd. | | |
|---|---|---|
| Weight | 102.0 g/m2 | (3.0 oz/yd$^2$) |
| Tensile Strength | | |
| Machine Direction (MD) | 12.6 N/cm | (7.2 lb/in) |
| Cross Direction (XD) | 12.8 N/cm | (7.3 lb/in) |
| Elongation @ Break | | |
| Machine Direction (MD) | 3.3% | |
| Cross Direction (XD) | 13.5% | |

Four laminates were prepared using the ACC of Table 1 which was laminated to the fabrics described below A. PPD-T Fabric A high modulus fabric using 100% PPD-T staple fibers was prepared as follows: 3.8 cm (1½ inch) long, 1.5 dpf T-29 PPD-T staple fibers were opened, carded and drawn on a cotton system to make a sliver. The sliver was spun into yarn on an air-jet open end spinning machine to form a 60 cotton count 100% PPD-T yarn. The single yarns were "S" ply-twisted 8.5 turns per cm (21.6 turns per count).

The plied yarn so formed was woven on a shuttle loom into a plain-weave fabric. The greige fabric had a construction of 20 ends per cm (50 ends per in)×16 picks per cm (40 picks per in) and a basis weight of 76 g/m$^2$ (2.25 oz/yd$^2$).

B. Nomex ® 456 Fabric (commercially available from E. I. du Pont de Nemours and Company, Wilmington, Del.)

Fiber:
 95% 1.5 dpf 1.5 in. colored Nomex ® fiber
 5% 1.5 dpf 1.5 in. T-29 PPD-T fiber Yarn:
 37/2 cc
Fabric construction:
 28 ends per cm. (70/in)×19 picks per cm (19/in).
 15.25 kg/m$^2$
Fabric scoured with 1.0 gm/liter Merpol HCS (PH 5.0) and dried @350° F.
Fabric was water repellent treated using "Zepel ® B" (3% of weight of fabric), dried at 250° F. and cured at 340° F. for 3 minutes.

C. Military Fabric Battle Dress Uniform (BDU) manufactured in conformance with U.S Military - Spec. 44031B B. W. 8.8 oz/yd$^2$
Fiber:
 50% 1¼", 2.25–2.5 dpf SD Nylon
 50% cotton
Weave:
 2×1 left hand twill D. Nylon Tricot Fabric prepared in conformance with U.S. Military specification C 43858

B. W. 3 oz/yd$^2$
Fiber: 100% Nylon

Laminates of the invention, Examples 1 and 2, and control laminates, Controls 1 and 2, were prepared as shown in Table 2 by coating the PPD-T fabric A and the other fabrics B, C, and D with flame retardant polyester adhesive in a random dot pattern using commercial paste application through the screen method. The weight of the dot adhesive applied to the fabrics was in the range of 17 to 27 g/m$^2$ (0.5 to 0.8 oz/yd$^2$) and covered approximately 20% of the fabric area. The fabrics were bonded to the ACC (one or both sides) under 100 psig pressure, 280° F. temperature for 8–10 seconds bonding conditions which activated the flame resistant polyester dot adhesive and bonded the fabrics together.

TABLE 2

| | Tensile Strength nt/cm (lb/in) | | Elongation @ Break % | |
|---|---|---|---|---|
| Laminate | MD | XD | MD | XD |
| Example 1 - Fab. A//ACC//Fab. B | 235 (134.0) | 193 (110.0) | 6.0 | 3.3 |
| Example 2 - Fab. A//ACC | 189 (108.0) | 153 (87.0) | 7.0 | 5.9 |
| Control 1 - Fab. C//ACC//Fab. D | 316 (180.0) | 179 (102.0) | 48.0 | 32.0 |
| Control 2 - Fab. D//ACC//Fab. D | 144 (82.0) | 46 (26.0) | 59.0 | 90.0 |

The tensile properties of the four laminates were tested with the results represented in FIG. 1 and Table 2. The stress-strain curve in the Machine Direction (MD) shown in FIG. 1 and the data of Table 2 indicate that, even though Control 1 and 2 laminates have high strength at break, they do not have high strength at the low elongation levels (3–4%) at which the activated carbon fabrics break. Example 1 and 2 laminates, on the other hand, have high strength at low elongation levels. It was observed that, in the control laminates, the activated carbon fabric broke and developed holes under less than 18 N/cm (10 lb/in) load, whereas the laminates of the invention, Examples 1 and 2, did not break until after about 70 N/cm (40 lb/in) of load was applied.

EXAMPLE 3

In this example, the the ACC was bonded to a reinforcing fabric containing a blend of high initial modulus PPD-T staple fiber and low modulus fibers (cotton).

A high modulus fabric using 50% 3.8 cm (1½ in.) long, 1.5 dpf T-29 PPD-T fibers and 50% pima cotton fibers were prepared by blending the fibers and opening carding and drawing on a cotton system to make a sliver. The sliver was ring spun into a 60/1 cotton count with 12 turns per cm (30.6 tpi) (3.95 "Z" twist multiplier). The yarn was woven on a shuttle loom into a plain weave fabric. The greige fabric had a construction of 31 ends per cm (80/in)×31 picks per cm (80/in) and a basis weight of 63 g/m² (1.85 oz/yd²).

The tensile strength and elongation properties of this product are shown in Table 3 below and also on FIG. 1.

TABLE 3

| Laminate | Tensile Strength N/cm (lb/in) | | Elongation @ Break % | |
| --- | --- | --- | --- | --- |
|  | MD | XD | MD | XD |
| Example 3 | 81 (46.4) | 62 (35.1) | 4.86 | 6.64 |

I claim:

1. A laminated fabric suitable for use in protective clothing comprising a layer of activated charcoal cloth and a layer of woven reinforcing fabric adhered thereto, said layer of reinforcing fabric having a weight less than about 100 g/m2 and containing sufficient high initial modulus aramid fiber to impart to said reinforcing fabric a tensile strength greater than about 44 newton/cm at an elongation of 3.5%.

2. The laminated fabric of claim 1 wherein said high initial modulus aramid fiber in said reinforcing fabric is staple fiber, said staple fiber comprising between about 40% and about 100% of the total fiber in said reinforcing fabric.

3. The laminated fabric of claim 2 wherein said reinforcing fabric comprises between about 0% and about 60% of flame retardant low modulus staple fiber.

4. The laminated fabric of claim 2 wherein at least about 50% of the total fiber in said reinforcing fabric is said high modulus aramid fiber staple.

5. The laminated fabric of claim 2 wherein said high modulus aramid fiber staple has a fiber length of between about 2.0 cm and about 7.5 cm.

6. The laminated fabric of claim 2 wherein said high modulus aramid fiber staple has a linear density per filament of between about 0.9 dtex and about 2.7 dtex.

7. The laminated fabric of claim 2 wherein said high modulus aramid fiber staple is poly(paraphenylene terephthalamide) staple.

8. The laminated fabric of claim 3 wherein said flame retardant low modulus staple fiber is selected from the class consisting of poly(metaphenylene isothalamide) and cotton.

9. The laminated fabric of claim 3 wherein said reinforcing fabric is plain woven from between about 10 and about 70 cotton count yarns.

10. The laminated fabric of claim 9 wherein said reinforcing fabric has a weight of between about 35 and about 85 g/m2.

11. The laminated fabric of claim 1 wherein said activated charcoal cloth has a weight of between about 65 and about 200 g/m2.

12. The laminated fabric of claim 1 wherein said activated charcoal cloth is adhered to said reinforcing fabric with a flame retardant thermoplastic adhesive applied in a random dot pattern, said adhesive covering between about 20% and about 60% of the fabric area.

* * * * *